(12) United States Patent
Zimmerman et al.

(10) Patent No.: US 8,265,137 B2
(45) Date of Patent: Sep. 11, 2012

(54) ADAPTIVE LANGUAGE DESCRIPTORS

(75) Inventors: Jeffrey Walter Zimmerman, Lenexa, KS (US); Bradley C. Griner, Kansas City, MO (US); Donald L. Randolph, Lenexa, KS (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1008 days.

(21) Appl. No.: 12/184,041

(22) Filed: Jul. 31, 2008

(65) Prior Publication Data

US 2010/0027613 A1 Feb. 4, 2010

(51) Int. Cl.
*H04N 11/02* (2006.01)
(52) U.S. Cl. .................................. 375/240.01
(58) Field of Classification Search ............ 375/240.01–240.26; 386/241, 386/278, 283, 285
See application file for complete search history.

(56) References Cited

U.S. PATENT DOCUMENTS

| 6,661,466 B1 | 12/2003 | Kou | |
|---|---|---|---|
| 7,073,193 B2 | 7/2006 | Marsh | |
| 7,363,649 B2 * | 4/2008 | Marsh | 725/114 |
| 7,379,661 B2 | 5/2008 | Lamkin | |
| 7,742,106 B2 * | 6/2010 | Ko et al. | 348/569 |
| 2007/0177062 A1 * | 8/2007 | Sakon | 348/732 |
| 2008/0310823 A1 * | 12/2008 | Jekal | 386/97 |

OTHER PUBLICATIONS

EN 300 468 V1.3.1, Digital Video Broadcasting (DVB); Specification for Service Information (SI) in DVB systems, European Telecommunications Standards Institute, 74 pages, 1998.*

* cited by examiner

*Primary Examiner* — Frank Duong
(74) *Attorney, Agent, or Firm* — Jackson Walker L.L.P.

(57) ABSTRACT

A disclosed methodology for processing language descriptors includes receiving streaming multimedia content that includes initial language descriptors. Portions of the multimedia content stream are encapsulated into packets that include an indication of the initial language descriptors. Later in time, further language descriptors are received with the streaming multimedia content. As a series of packets created from the multimedia content stream are processed, the indication of received language descriptor is adapted to account for any change in the language of audio tracks received with the streaming multimedia content.

20 Claims, 4 Drawing Sheets

ADAPTIVE LANGUAGE DESCRIPTORS

BACKGROUND

1. Field of the Disclosure

The present disclosure generally relates to digital television provider networks and more particularly to systems and methods for processing adaptive language descriptors.

2. Description of the Related Art

Digital television provider networks provide television programs to viewers. The programs typically have audio tracks, and in some cases have multiple selectable audio tracks.

DESCRIPTION OF THE EMBODIMENT(S)

Figure 1:
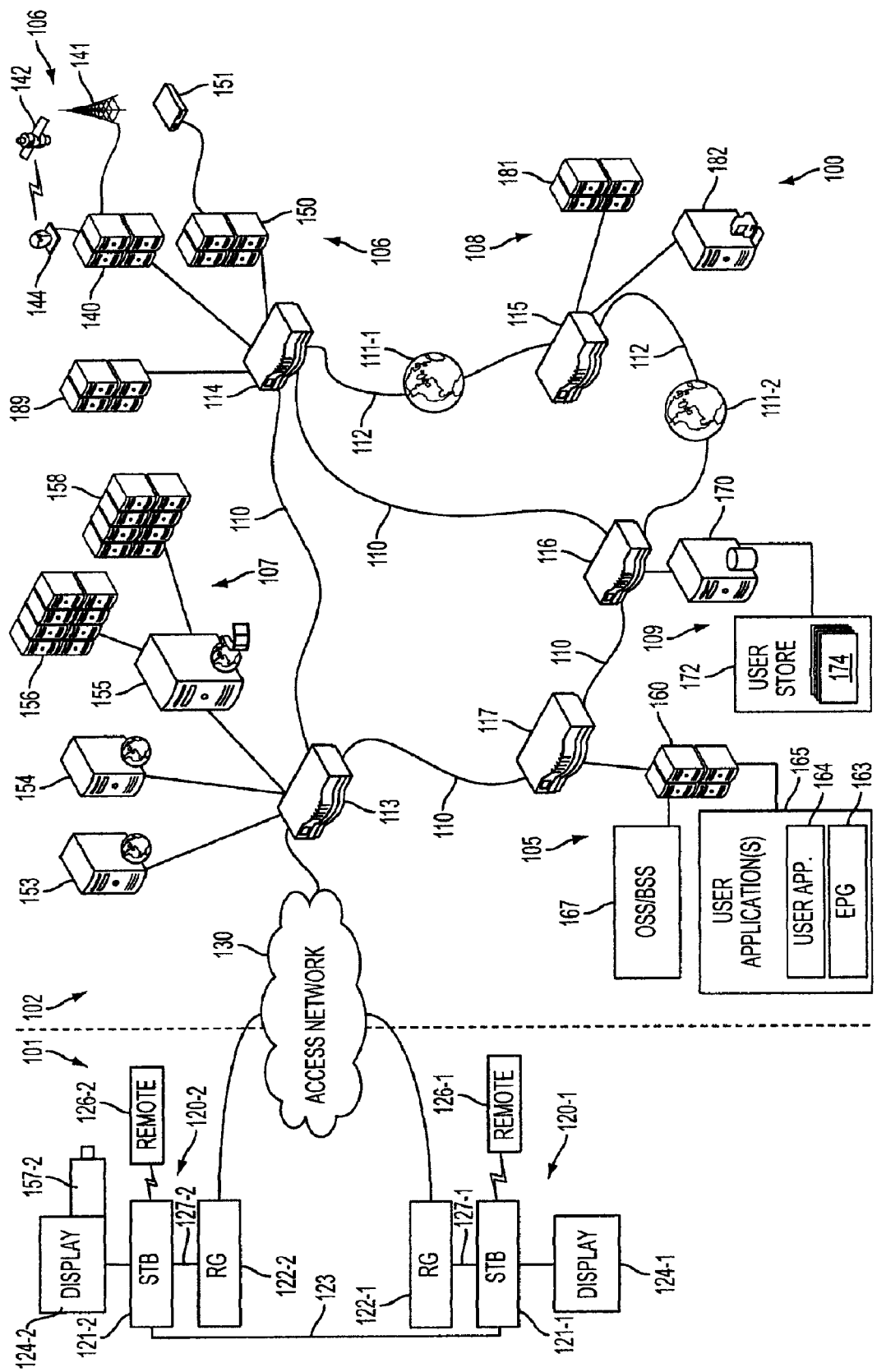
FIG. 1 illustrates a representative Internet Protocol Television (IPTV) architecture suitable for processing language descriptors in accordance with disclosed embodiments.

In one aspect, a method of encapsulating streaming multimedia content into a plurality of packets includes receiving the streaming multimedia content. In some embodiments, the streaming multimedia content includes an initial language descriptor. The method further includes encapsulating a portion of the streaming multimedia content into a series of packets. Each packet in the series may include an indication of the initial language descriptor. The method includes adapting to detecting a change in language by receiving a further language descriptor and including an indication of the further language descriptor in subsequent packets. In some embodiments, the streaming multimedia content is received as an analog stream and the method further includes digitizing the analog stream. The method may further include compressing the streaming multimedia content. The indication of the language descriptor may be included in a header. The packets in the series of packets may further include a payload that includes, in some embodiments, a plurality of Moving Picture Experts Group (MPEG) transport stream packets.

In another aspect, a computer program product stored on a computer-readable media includes instructions for encapsulating streaming multimedia content into a plurality of packets. The computer program product has instructions for identifying an initial language descriptor received with the streaming multimedia content, instructions for providing an indication of the initial language descriptor with a packet that encapsulates a portion of the streaming multimedia content, and instructions for monitoring streaming multimedia content for a change from the initial language descriptor. Upon detecting a change from the initial language descriptor to a further language descriptor, instructions for providing an indication of the further language descriptor within a subsequent packet are executed. The subsequent packet encapsulates further portions of the streaming multimedia content. In some embodiments, the streaming multimedia content is received as an analog stream and the computer program product includes instructions for converting the analog stream into a digital bit stream. Encapsulated packets may include a header that is used for transporting the indication of the language descriptor.

In still another aspect, a disclosed encoder provides digital television content including indications of language descriptors. The encoder includes an input for receiving a multimedia content stream having an initial language descriptor value indicative of a language associated with an audio portion of the multimedia content stream. The encoder further includes a processor for encapsulating a portion of the streaming multimedia content into a series of packets. Individual packets of a first portion of the series of packets have a packet header with an indication of the initial language descriptor. The processor is enabled to adapt packet headers for a second series of packets to have an indication of another language descriptor. In some embodiments of the encoder, the multimedia content stream is received as an analog stream and the encoder is further enabled for processing the analog stream into a digital bit stream. In some embodiments, the processor is further enabled for compressing the digital bit stream. In still other embodiments of the encoder, individual packets of the first portion of the series of packets include a plurality of MPEG transport stream packets.

Multimedia content is often introduced into a digital television provider network through various sources including terrestrial broadcast networks, DVDs, computer networks, satellite networks, and the like. Multimedia content that is encoded for distribution within a digital television provider network may have audio tracks and closed-captioned data associated with one or more languages. For example, a television program may have a primary audio track in Italian and a secondary audio track in English. In some cases, language descriptors associated with programs are included within packet headers, sideband data, or metadata associated with broadcast streams of the program content. However, during encoding, the language descriptors that are originally associated with multimedia programs may be stripped off or otherwise excluded from encoded streams within the digital television provider network. In some digital television provider networks, to determine the language associated with a multimedia program, a person associated with the provider network (e.g., an employee) may listen to portions of the audio tracks and determine the language or languages associated with the audio tracks. Such language determination procedures may be error prone, for at least the reason that, in some cases, the person may have to guess the language for the program. In some cases, external test instrumentations may be used to "read" an audio descriptor from an incoming signal and then statically assign a language descriptor code (e.g., an International Standards Organization (ISO) 639 language descriptor code) for an encoded video stream (e.g., an H.264 stream). In some cases, although static language descriptors are assigned for the entire program, the program or advertisements inserted within the program may alternate between languages or change languages altogether. In some cases, a user may select a secondary audio track of a first language and then hear no audio during advertisements that have audio tracks in other languages. Embodiments disclosed herein incorporate language descriptors into multimedia streams that adaptively change according to upstream language descriptors that may be provided by an original signal provider or content provider (e.g., a terrestrial broadcast station, satellite provider, or locally inserted advertisement).

Accordingly, disclosed embodiments receive language descriptors and pass indications of the language descriptors during the encoding process. For example, ISO language descriptors from embedded data within video streams from content providers may be passed along at the serial digital interface ("SDI") level rather than statically created and used for an entire program including advertisements. Therefore, an end user of a client device (e.g., a set-top box (STB), receiver, or other customer premise equipment (CPE)) used to receive and process H.264 encoded streams may select from a list of languages for a multimedia program with confidence that the selected language is available.

The term "H.264" is an exemplary standard for video compression. It may also be referred to as "MPEG-4 Part 10", or "MPEG-4 AVC," in which "AVC" stands for "Advanced Video Coding" and "MPEG" stands for "Moving Picture Experts Group." H.264 is a block-oriented, motion-estimation-based codec. H.264 is used for the compression of audio-visual (AV) data for streaming media, web distribution, voice applications, videophone applications, digital television distribution, and the like. Reference herein to H.264 is for illustrative purposes and is not meant to limit the claimed subject matter.

ISO 639 is an exemplary set of international standards that lists codes for language names. Such codes are frequently embedded into video streams by content providers. In some systems, the information is ignored, stripped, or dropped during encoding of the video streams for distribution on a multimedia content distribution network. In accordance with disclosed embodiments, decoders that process incoming video streams adaptively and reiteratively read the ISO language descriptors or other language descriptors and pass an indication of the descriptors along to encoded H.264 multicast streams, for example.

In the following description, details are set forth by way of example to enable one of ordinary skill in the art to practice the claimed subject matter without undue experimentation. It should be apparent to a person of ordinary skill that disclosed embodiments are examples and not exhaustive of all possible embodiments. Regarding reference numerals used to describe elements in the figures, a hyphenated form of a reference numeral refers to a specific instance of an element and the un-hyphenated form of the reference numeral refers to the element generically or collectively. Thus, for example, element "121-1" refers to an instance of an STB, which may be referred to collectively as STBs "121" and any one of which may be referred to generically as an STB "121." Before describing other details of embodied methods and devices, selected aspects of digital television provider networks that provide multimedia programs are described to provide further context.

Television programs, video on-demand (VOD) movies, digital television content, music programming, and a variety of other types of multimedia content may be distributed to multiple users (e.g., subscribers) over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a relatively large number of multimedia content channels (also referred to herein simply as "channels"), each occupying a different frequency band or frequency channel, through a coaxial cable, a fiber-optic cable, or a combination of the two. The bandwidth required to transport simultaneously large numbers of multimedia channels may challenge cable-based providers. In these types of networks, a tuner within an STB, television, or other form of receiver is required to select a channel from the mixed signal for playing or recording. A user wishing to play or record multiple channels typically needs to have distinct tuners for each desired channel. This is an inherent limitation of cable networks and other mixed signal networks.

In contrast to mixed signal networks, IPTV networks generally distribute content to a user only in response to a user request so that, at any given time, the number of content channels being provided to a user is relatively small, e.g., one channel for each operating television plus possibly one or two channels for simultaneous recording. As suggested by the name, IPTV networks typically employ IP and other open, mature, and pervasive networking technologies. Instead of being associated with a particular frequency band, an IPTV television program, movie, or other form of multimedia content is a packet-based stream that corresponds to a particular network address or network socket, e.g. a UDP port in combination with an IP address, e.g., an IP address. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an IP or analogous type of network address and a UDP port or analogous type of port valve that is associated with the desired channel.

IPTV may be implemented, at least in part, over existing infrastructure including, for example, a proprietary network that may include existing telephone lines, possibly in combination with CPE including, for example, a digital subscriber line (DSL) modem in communication with an STB, a display, and other appropriate equipment to receive multimedia content from a provider network and convert such content into usable form. In some implementations, a core portion or backbone of an IPTV network is implemented with fiber optic cables while the so-called "last mile" or access network may include conventional, unshielded, twisted-pair, copper cables.

IPTV networks support bidirectional (i.e., two-way) communication between a subscriber's CPE and a service provider's equipment. Bidirectional communication allows a service provider to deploy advanced features, such as VOD, pay-per-view, advanced programming information (e.g., sophisticated and customizable electronic program guides (EPGs), and the like. Bidirectional networks may also enable a service provider to collect information related to a user's preferences, whether for purposes of providing preference based features to the user, providing potentially valuable information to service providers, or providing potentially lucrative information to content providers and others.

Referring now to the drawings, FIG. 1 illustrates selected aspects of a multimedia content distribution network (MCDN) 100 that is suitable for adaptively providing language descriptors in accordance with disclosed embodiments. MCDN 100, as shown, is a digital television provider network that may be generally divided into a client side 101 and a service provider side 102 (a.k.a. server side 102). The client side 101 includes all or most of the resources depicted to the left of access network 130 while the server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical wires that connect a subscriber's home or business to a local exchange. In these embodiments, the physical layer of access network 130 may include twisted-pair copper cables or fiber optics cables employed as either fiber to the curb (FTTC) or fiber to the home (FTTH).

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to twisted pair for DSL delivery to consumers.

Access network 130 may transmit radio frequency (RF) signals over coaxial cables. In these embodiments, access network 130 may utilize quadrature amplitude modulation (QAM) equipment for downstream traffic. In these embodiments, access network 130 may receive upstream traffic from a consumer's location using quadrature phase shift keying (QPSK) modulated RF signals. In such embodiments, a cable modem termination system (CMTS) may be used to mediate between IP-based traffic on private network 110 and access network 130.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more video hub offices (VHOs). In large-scale implementations of MCDN 100, which may cover a geographic region comparable, for example, to the region served by telephony-based broadband services, private network 110 may include a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements from local entities. The regional VHOs may then deliver the local and national content for reception by subscribers served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls, not depicted, that maintain the security and privacy of network 110. Other portions of MCDN 100 communicate over a public network 112, including, for example, the Internet or other type of web-network where the public network 112 is signified in FIG. 1 by the World Wide Web icons 111.

As shown in FIG. 1, the client side 101 of MCDN 100 depicts two of a potentially large number of client side resources referred to herein simply as client(s) 120. Each client 120, as shown, includes an STB 121, a residential gateway (RG) 122, a display 124, and a remote control device 126. In the depicted embodiment, STB 121 communicates with server side devices through access network 130 via RG 122.

As shown in FIG. 1, RG 122 may include elements of a broadband modem such as a DSL modem, as well as elements of a router and/or access point for an Ethernet or other suitable local area network (LAN) 123. In this embodiment, STB 121 is a uniquely addressable Ethernet compliant device. In some embodiments, display 124 may be any National Television System Committee (NTSC) and/or Phase Alternating Line (PAL) compliant display device. Both STB 121 and display 124 may include any form of conventional frequency tuner. Remote control device 126 communicates wirelessly with STB 121 using an infrared (IR) or RF signal. STB 121-1 and STB 121-2, as shown, may communicate through LAN 123 in accordance with disclosed embodiments to select multimedia programs for viewing. Although depicted as distinct elements in FIG. 1, any combination of display 124, STB 121 and RG 122 may be integrated within a single device.

In IPTV compliant implementations of MCDN 100, the clients 120 are operable to receive packet-based multimedia streams from access network 130 and process the streams for presentation on displays 124. In addition, clients 120 are network-aware systems that may facilitate bidirectional-networked communications with server side resources to facilitate network hosted services and features. Because clients 120 are operable to process multimedia content streams while simultaneously supporting more traditional web-like communications, clients 120 may support or comply with a variety of different types of network protocols including streaming protocols such as reliable datagram protocol (RDP) over user datagram protocol/internet protocol (UDP/IP) as well as web protocols such as hypertext transport protocol (HTTP) over transport control protocol (TCP/IP).

The server side 102 of MCDN 100 as depicted in FIG. 1 emphasizes network capabilities including application resources 105, which may have access to database resources 109, content acquisition resources 106, content delivery resources 107, and OSS/BSS resources 108.

Before distributing multimedia content to users, MCDN 100 first obtains multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture downlinked signals transmitted by a satellite 142 and received by a parabolic dish 144. In addition, live acquisition server 140 may acquire programming feeds transmitted via high-speed fiber feeds or other suitable transmission means. Acquisition resources 106 may further include signal conditioning systems and content preparation systems for encoding content. As shown, content acquisition resources 106 includes encoder 189 in accordance with disclosed embodiments. Encoder 189 receives language descriptors (e.g., ISO 639 descriptors) from embedded data within video streams acquired by acquisition resources 106. Indications of the language descriptors are passed along with encoded streams and adapted to account for changes of the language of a received multimedia stream.

In some embodiments, encoder 189 provides digital television content that includes indications of received language descriptors within packet headers. Some embodied examples of encoder 189 may include an input for receiving a multimedia content stream that includes an initial language descriptor. The value of the initial language descriptor value indicates a language associated with an audio portion of the received multimedia content stream. Embodiments of encoder 189 may employ a processor for encapsulating a portion of streaming multimedia content into a series of packets. Individual packets of the series of packets, in accordance with disclosed embodiments, include a packet header with an indication of the received initial language descriptor. In some embodiments of encoder 189, an embedded processor adapts subsequent packet headers to include a second indication of a language descriptor that accounts for a change in language. For example, if the language descriptor for a multimedia content stream changes from Italian to English, an embodiment of encoder 189 may include indications of this change within headers of packets that are encoded by encoder 189 after the language change occurs. If a received multimedia content stream is an analog stream, encoder 189 may further be enabled for digitizing the analog stream, i.e. converting the analog stream into a digital bit stream. A processor within an embodiment of encoder 189 may further be enabled for compressing the digital bit stream. Individual packets encoded by encoder 189 may include, for example, a plurality of MPEG transport stream packets.

In some embodiments, encoder 189 may be embodied as any installation of hardware and software modules that take multimedia data feeds and convert them into digital streams (e.g., real-time transport protocol (RTP) streams). In FIG. 1, the depicted configuration of encoder 189 within content acquisition resources 106 is for illustrative purposes only and not meant to limit the claimed subject matter. Multimedia data feeds may come from multiple sources including spooled files on a network disk drive, digital input streams from satellite systems, over air broadcast transmissions, and the like. Multimedia data feeds may include primary and secondary audio programming ("SAP"). SAP is an auxiliary audio channel that may be in an alternate language. Alternatively, SAP may be used for an adult audio track and a primary audio channel may be used for the same audio track that is edited as suitable for children.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 may transmit acquired content over private network 110, for example, to one or more servers in content delivery resources 107. As shown, live acquisition server 140 is communicatively coupled to encoder 189 which, prior to transmission, encodes acquired content using for example, MPEG-2, H.263, MPEG-4, H.264, a Windows Media Video (WMV) family codec, or another suitable video codec. Similarly, VOD acquisition server 150 is communicatively coupled to encoder 189 to encode content acquired for distribution within MCDN 100. In accordance with disclosed embodiments, encoded content contains adapted indications of language descriptors that track language descriptors of acquired content. Acquired content may be encoded and compressed to preserve network bandwidth and network storage resources and, optionally, to provide encryption for securing the content. VOD content acquired by VOD acquisition server 150 may be in a compressed format prior to acquisition and further compression or formatting prior to transmission may be unnecessary and/or optional.

Content delivery resources 107, as shown in FIG. 1, are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to user requests for content by providing the requested content to the user. The content delivery resources 107 are, in some embodiments, responsible for creating video streams that are suitable for transmission over private network 110 and/or access network 130. Therefore, embodied encoders and systems for adaptively providing language descriptors may reside with content delivery resources 107. In some embodiments, creating video streams from the stored content generally includes generating data packets by encapsulating relatively small segments of the stored content according to the network communication protocol stack in use. These data packets are then transmitted across a network to a receiver (e.g., STB 121 of client 120), where the content is parsed from individual packets and re-assembled into multimedia content suitable for processing by an STB decoder.

User requests received by content delivery server 155 may include an indication of the content that is being requested. In some embodiments, this indication may include an IP address, a UDP or TCP port, or a combination thereof, associated with the desired content. For example, a particular local broadcast television station may be associated with a particular channel and the feed for that channel may be associated with a particular IP address and UDP port. When a user wishes to view the station, the user may interact with remote control device 126 to send a signal to STB 121 indicating a request for the particular channel. When STB 121 responds to the remote control signal, the STB 121 changes to the requested channel by transmitting a request that indicates a network address or network socket associated with the desired channel to content delivery server 155.

Content delivery server 155 may respond to such requests by making a streaming video signal accessible to the user. In the case of multicast, content delivery server 155 employs a multicast protocol to deliver a single originating stream to multiple clients. When a new user requests the content associated with a multicast stream, there may be latency associated with updating the multicast information to reflect the new user as a part of the multicast group. To avoid exposing this undesirable latency to a user, content delivery server 155 may temporarily unicast a stream to the requesting user. When the user is ultimately enrolled in the multicast group, the unicast stream is terminated and the user receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101, including client 120, and server side 102. Client-facing switch 113, as shown, is so-named because it connects directly to the client 120 via access network 130 and it provides the network connectivity of IPTV services to users' locations. To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including, RTP, real-time control protocol (RTCP), file transfer protocol (FTP), and real-time streaming protocol (RTSP), as examples.

In some embodiments, client-facing switch 113 routes multimedia content encapsulated into IP packets over access network 130. For example, an MPEG-2 transport stream may be sent, in which the transport stream consists of a series of 188-byte transport packets. Client-facing switch 113, as shown, is coupled to a content delivery server 155, acquisition switch 114, applications switch 117, a client gateway 153, and a terminal server 154 that is operable to provide terminal devices with a connection point to private network 110. Client gateway 153 may provide subscriber access to private network 110 and the resources coupled thereto.

In some embodiments, STB 121 may access MCDN 100 using information received from client gateway 153. Subscriber devices may access client gateway 153 and client gateway 153 may then allow such devices to access private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies subscriber information by communicating with user store 172 via private network 110. Client gateway 153 may verify billing information and subscriber status by communicating with an OSS/BSS gateway 167. OSS/BSS gateway 167 may transmit a query to the OSS/BSS server 181 via an OSS/BSS switch 115 that may be connected to a public network 112. Upon client gateway 153 confirming subscriber and/or billing information, client gateway 153 may allow STB 121 access to IPTV content, VOD content, and other services. If client gateway 153 cannot verify subscriber information (i.e., user information) for STB 121, for example, because it is connected to an unauthorized twisted pair or RG, client gateway 153 may block transmissions to and from STB 121 beyond the private access network 130.

MCDN 100, as depicted, includes application resources 105, which communicate with private network 110 via application switch 117. Application resources 105 as shown include an application server 160 operable to host or otherwise facilitate one or more subscriber applications 165 that may be made available to system subscribers. For example, subscriber applications 165 as shown include an EPG application 163. Subscriber applications 165 may include other applications as well. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

Application server 160 as shown also hosts an application referred to generically as user application 164. User application 164 represents an application that may deliver a value added feature to a user, who may be a subscriber to a service provided by MCDN 100. For example, in accordance with disclosed embodiments, user application 164 may be an application that provides a user with one or more selectable audio tracks for a received digital television program. User application 164 is illustrated in FIG. 1 to emphasize the ability to extend the network's capabilities by implementing a network-hosted application. Because user application 164 resides on the network, it generally does not impose any significant requirements or imply any substantial modifications to the client 120 including the STB 121. In some instances, an STB 121 may require knowledge of a network address associated with user application 164, but STB 121 and the other components of client 120 are largely unaffected.

As shown in FIG. 1, a database switch 116 connected to applications switch 117 provides access to database resources 109. Database resources 109 include a database server 170 that manages a system storage resource, referred to herein as user store 172. User store 172, as shown, includes one or more user profiles 174 where each user profile includes account information and may include preferences information that may be retrieved by applications executing on application server 160 including subscriber applications 165.

MCDN 100, as shown, includes an OSS/BSS resource 108 including an OSS/BSS switch 115. OSS/BSS switch 115 facilitates communication between OSS/BSS resources 108 via public network 112. The OSS/BSS switch 115 is coupled to an OSS/BSS server 181 that hosts operations support services including remote management via a management server 182. OSS/BSS resources 108 may include a monitor server (not depicted) that monitors network devices within or coupled to MCDN 100 via, for example, a simple network management protocol (SNMP).

Figure 2:
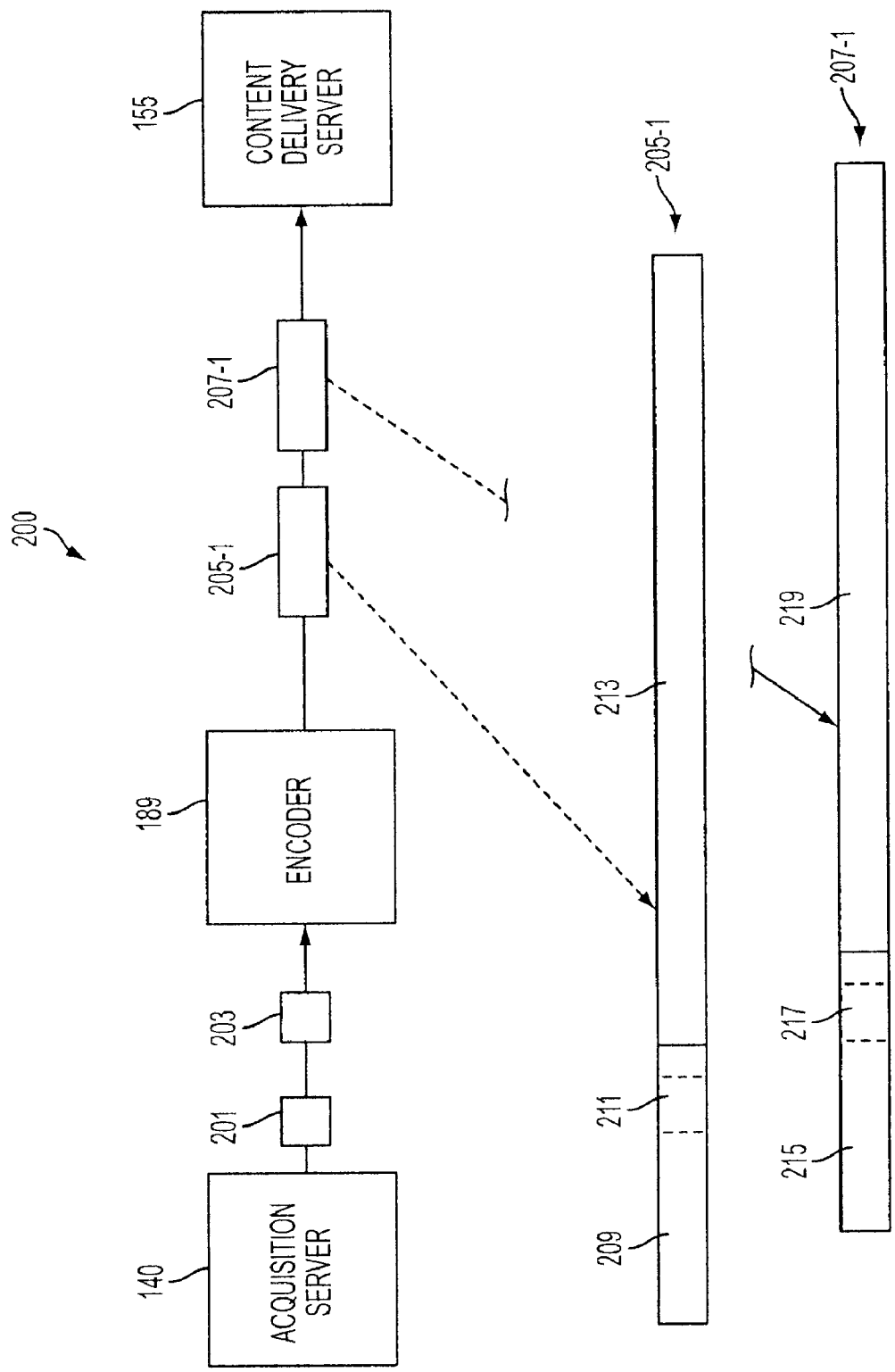
FIG. 2 illustrates additional aspects of an exemplary architecture for processing language descriptors in accordance with disclosed embodiments.

FIG. 2 depicts additional aspects of an exemplary architecture 200 for processing language descriptors in accordance with disclosed embodiments. As shown, acquisition server 140 sends streaming multimedia content to an input of encoder 189. As shown in architecture 200, acquisition server 140 may correspond to live acquisition server 140 from FIG. 1 and encoder 189 may correspond to encoder 189 from FIG. 1. As shown, a first portion 201 and a second portion 203 of the streaming multimedia content are transmitted. In some embodiments, the first portion 201 includes a first or initial language descriptor and the second portion 203 includes a second or further language descriptor that differs from the initial language descriptor. As shown, encoder 189 encapsulates first portion 201 into packet 205-1 and encapsulates second portion 203 into packet 207-1 for delivery to content delivery server 155. Content delivery server 155 may correspond to content delivery server 155 of FIG. 1. As shown in the exploded view of packet 205-1, packet 205-1 includes header 209 and payload 213. Likewise, packet 207-1 includes header 215 and payload 219. In some embodiments, payload 213 and payload 219 may include multiple transport stream packets. Also, in some embodiments packet 205-1 and packet 207-1 are transported either at the RTP layer or the UDP layer, as examples. As shown, header 209 includes an indication 211 of a language descriptor (not depicted) received with portion 201 by encoder 189. Likewise, header 215 includes an indication 217 of a language descriptor (not depicted) of second portion 203 from the multimedia content stream received by encoder 189. Accordingly, encoder 189 is enabled and configured to adapt to language descriptors received from various portions of a multimedia content stream. Upon detecting a change of language for a received multimedia content stream, encoder 189 formulates packets encapsulated by encoder 189 with headers that indicate the most recently detected language.

Figure 3:
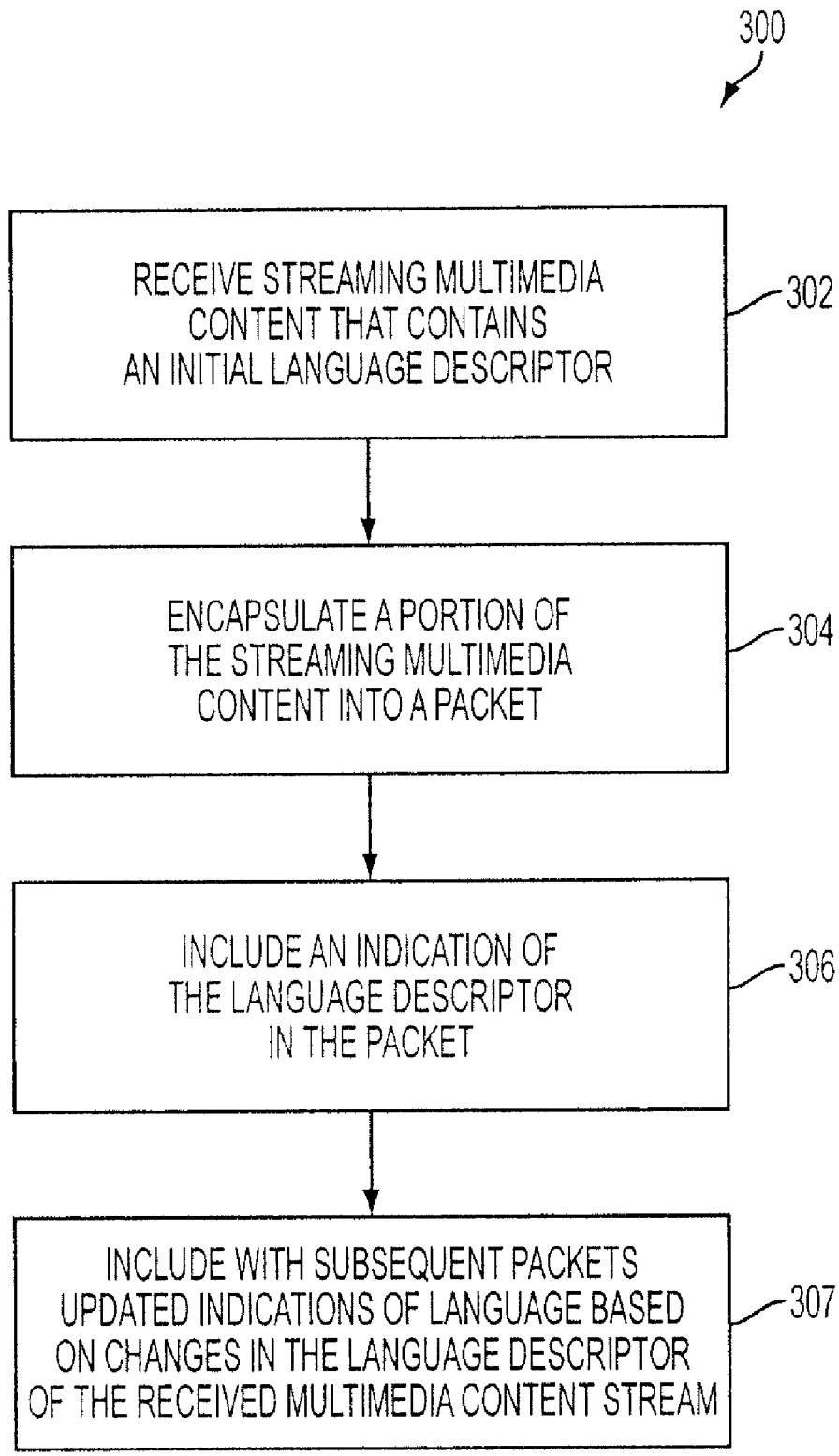
FIG. 3 illustrates operations in a methodology for processing language descriptors in accordance with disclosed embodiments.

FIG. 3 illustrates selected operations of a methodology 300 for processing language descriptors in accordance with disclosed embodiments. As shown, operation 302 relates to receiving streaming multimedia content that contains an initial language descriptor. For example, acquisition resources 106 (FIG. 1) may receive a streaming multimedia program with an ISO 639 language descriptor of "eng" or "en." The received language descriptor may be an ISO 639-1 code, an ISO 639-2 code, or any other representation of a language including numbered references to a proprietary database, for example. As shown in FIG. 3, operation 304 relates to encapsulating a portion of the streaming multimedia content into a packet. For example, a processor in an encoder may receive streaming multimedia content and encapsulate the content into a series of individual packets. As shown, operation 306 relates to including an indication of the received language descriptor within the encapsulated packets. Operation 307 relates to including updated indications of language with subsequent packets. In some embodiments, changes in the language descriptor of received multimedia content streams are monitored. In other cases, the language descriptors are passed through directly, without consideration as to whether the language descriptors have changed. In either case, embodied systems are adapted to provide content delivery resources and CPE with updated information regarding the language or languages associated with a digitized bit stream.

Figure 4:
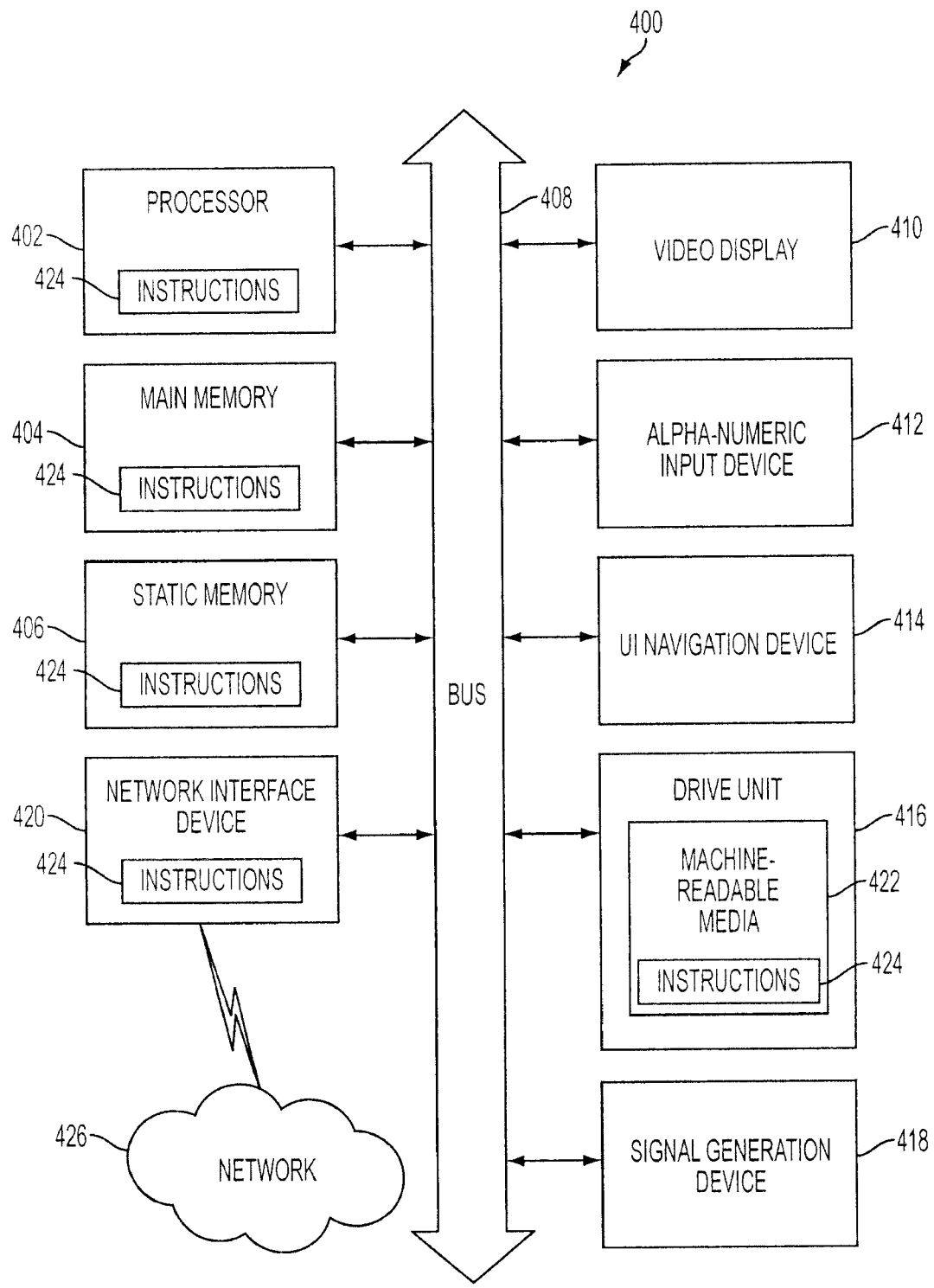
FIG. 4 illustrates a data processing system for use with disclosed embodiments to process language descriptors.

FIG. 4 illustrates in block diagram form a data processing system 400 within which a set of instructions may operate to perform one or more of the methodologies discussed herein. Data processing system 400 may operate as a standalone device or may be connected (e.g., networked) to other data processing systems. In a networked deployment, data processing system 400 may operate in the capacity of a server or a client data processing system in a server-client network environment, or as a peer computer in a peer-to-peer (or distributed) network environment. Example data processing systems include, but are not limited to an encoder, a digital video recorder, a personal computer (PC), a tablet PC, an STB, a cable box, a satellite box, an EPG box, a personal data assistant, a cellular telephone, a smart phone, a web appliance, a network router, a switch, a bridge, a server, or any machine capable of executing a set of instructions (sequential or otherwise) that specify actions to be taken by that machine. Further, while only a single data processing system is illustrated, the term "data processing system" encompasses any collection of data processing systems that individually or jointly execute a set (or multiple sets) of instructions to perform any one or more of the methodologies discussed herein.

As shown, data processing system 400 includes a processor 402 (e.g., a central processing unit or general purpose processor, a graphics processing unit, or both), and storage media 401 including a main memory 404, a non-violatile memory 406, and a drive unit 416 that may communicate with each other via a bus 408. In some embodiments, the main memory 404 and/or the non-volatile memory 406 may be used to store indicators or values that relate to multimedia content accessed or requested by a consumer. Data processing system 400 may further include a video display unit 410 (e.g., a television, a liquid crystal display, or a cathode ray tube) on which to display multimedia content such as pay-per-view sporting events, television programs, VOD movies, and the like. Data processing system 400 also includes an alphanumeric input device 412 (e.g., a keyboard or a remote control), a user interface (UI) navigation device 414 (e.g., a remote control or a mouse), a signal generation device 418 (e.g., a speaker) and a network interface device 420. The input device 412 and/or the UI navigation device 414 (e.g., the remote control) may include a processor (not shown), and a memory (not shown).

The disk drive unit 416 includes a machine-readable medium 422 that may have stored thereon one or more sets of instructions and data structures (e.g., instructions 424) embodying or utilized by any one or more of the methodologies or functions described herein. The instructions 424 may also reside, completely or at least partially, within the main memory 404, non-volatile memory 406, network interface device 420, and/or the processor 402 during execution thereof by the data processing system 400.

In some embodiments, instructions 424 and the storage media 401 in which the instructions 424 are embedded, comprise a computer program product. The computer program product includes instructions for identifying initial language descriptors received from streaming multimedia content, instructions for providing an indication of the initial language descriptor within a packet that encapsulates a portion of the streaming multimedia content, and instructions for monitoring streaming multimedia content for a change from the initial language descriptor and, upon a change, providing an indication of the further language descriptor within subsequent packets. Received multimedia content may be an analog stream and instructions 424 may include instructions for digitizing the analog stream into a digital bit stream. Further instructions may also enable data processing system 400 to compress the streaming multimedia content. In accordance with some embodiments, encapsulating the streaming multimedia content by data processing system 400 enabled by instructions 424 may include encapsulating the streaming multimedia content into a plurality of packets at transport layer such as an RTP layer and/or a UDP layer.

The instructions 424 may be transmitted or received over a network 426 (e.g., a digital television content provider) via the network interface device 420 utilizing any one of a number of transfer protocols (e.g., broadcast transmissions, HTTP). While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine (i.e., data processing system) and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the disclosed systems may be described in connection with one or more embodiments, it is not intended to limit the subject matter of the claims to the particular forms set forth. On the contrary, disclosed systems are intended to include alternatives, modifications and equivalents as may be included within the spirit and scope of the subject matter as defined by the appended claims. For example, the term "set-top box" or "STB" may be used to describe functionality that may be integrated into a television, residential gateway, or other customer premises equipment.

What is claimed is:

1. A method of encapsulating streaming multimedia content, the method comprising:
receiving the streaming multimedia content, wherein the streaming multimedia content includes an initial language descriptor;
encapsulating, by an encoder, a portion of the streaming multimedia content into a packet, wherein the packet includes an indication of the initial language descriptor; and subsequently receiving, by the encoder, a further language descriptor and, in response thereto, including an indication of the further language descriptor in a subsequent packet.

2. The method of claim 1, wherein the streaming multimedia content is received as an analog stream, wherein the method further comprises:
processing the analog stream to generate a digital bit stream.

3. The method of claim 1, wherein the method further comprises:
compressing the streaming multimedia content.

4. The method of claim 1, wherein the packet includes a header, wherein the header includes the indication of the language descriptor.

5. The method of claim 4, wherein the header further includes a program identifier.

6. The method of claim 4, wherein the packet further includes a payload, wherein the payload includes a plurality of MPEG transport stream packets.

7. The method of claim 1, wherein the encapsulating occurs at least partially at a real-time transport protocol layer.

8. The method of claim 7, wherein the encapsulating occurs at least partially at a user datagram protocol layer.

9. A non-transitory computer readable medium storing program instructions, executable by a processor, for encapsulating streaming multimedia content into a plurality of packets, the program instructions, when executed by the processor, performing a method comprising:
identifying an initial language descriptor received with the streaming multimedia content;
providing an indication of the initial language descriptor in a packet, wherein the packet encapsulates a portion of the streaming multimedia content;
monitoring the streaming multimedia content for a change from the initial language descriptor; and
upon detecting a change from the initial language descriptor to a further language descriptor, providing an indication of the further language descriptor in a subsequent packet, wherein the subsequent packet encapsulates a chronologically subsequent portion of the streaming multimedia content.

10. The computer readable medium of claim 9, wherein the streaming multimedia content is received as an analog stream, wherein the method includes:
digitizing the analog stream into a digital bit stream.

11. The computer readable medium of claim 9, wherein the method includes:
compressing the streaming multimedia content.

12. The computer readable medium of claim 9, wherein the packet includes a header, wherein the header includes the indication of the language descriptor.

13. The computer readable medium of claim 9, wherein the header further includes a program identifier.

14. The computer readable medium of claim 12, wherein the packet further includes a payload, wherein the payload includes a plurality of MPEG transport stream packets.

15. The computer readable medium of claim 9, wherein encapsulating the streaming multimedia content into a plurality of packets occurs at least partially at a real-time transport protocol layer.

16. The computer readable medium of claim 15, wherein a further portion of encapsulating the streaming multimedia content into a plurality of packets occurs at least partially at a user datagram protocol layer.

17. An encoder for providing digital television content that includes indications of received language descriptor values, the encoder comprising:
an input for receiving a multimedia content stream that includes an initial language descriptor value indicative of a language associated with an audio component of an initial portion of the multimedia content stream; and
a processor for encapsulating streaming multimedia content into a series of packets, wherein individual packets of a first portion of the series of packets include a packet header with an indication of the initial language descriptor value, wherein the processor is further for adapting further packet headers associated with a subsequent portion of the series of packets to include a further indication of a further language descriptor.

18. The encoder of claim 17, wherein the multimedia content stream is received as an analog stream, wherein the processor is further enabled for digitizing the analog stream.

19. The encoder of claim 18, wherein the processor is further enabled for compressing the multimedia content bit stream.

20. The encoder of claim 17, wherein individual packets of the first portion of the series of packets include a plurality of MPEG transport stream packets.

* * * * *